Dec. 21, 1965   F. M. WOOD ET AL   3,225,293
APPARATUS FOR INSPECTING PIPE FOR DEFECTS
Filed Feb. 20, 1964
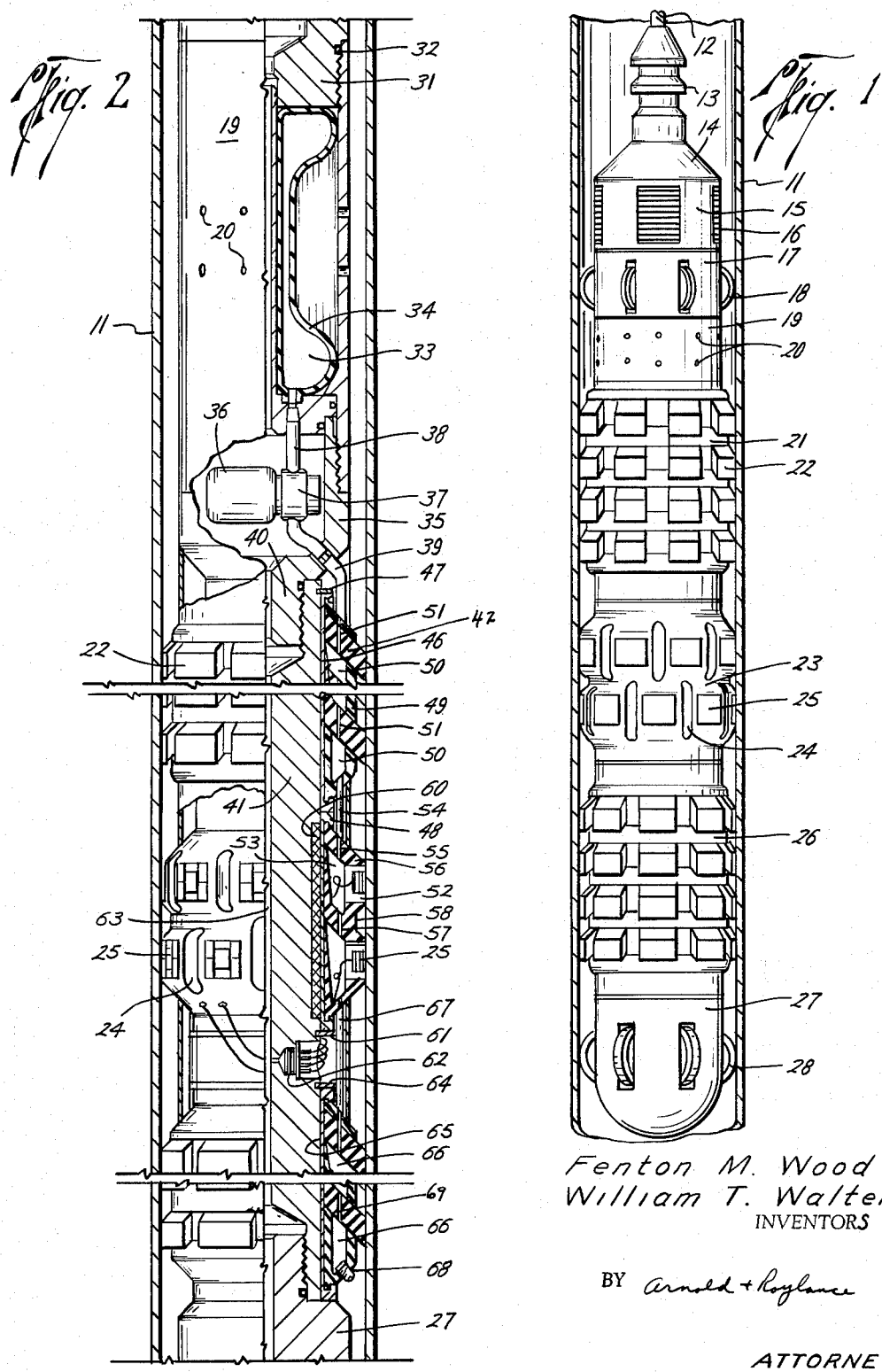
Fenton M. Wood
William T. Walters
INVENTORS
BY Arnold + Roylance
ATTORNEY United States Patent Office 3,225,293
Patented Dec. 21, 1965

3,225,293
APPARATUS FOR INSPECTING PIPE
FOR DEFECTS
Fenton M. Wood, 110 Sorrento, Sugarland, Tex., and
William T. Walters, 506 Forest Oaks, Houston, Tex.
Filed Feb. 20, 1964, Ser. No. 346,303
7 Claims. (Cl. 324—37)

This invention relates to an apparatus for inspecting pipe for defects from the inside. More particularly the invention relates to an apparatus for passing through a pipe and magnetizing a portion of the pipe by the use of expandable magnetizing means such that the air gap in the magnetic field is reduced to a minimum.

There has long been need for an apparatus which could be passed axially through a pipe and inspect the pipe for defects and which at the same time would have the air gaps in the magnetic field reduced to a minimum.

When utilizing rigid magnetizing means of the prior art the magnet had to be kept away from the inside surface of the pipe a sufficient distance to permit clearance of the magnet through the pipe and at the same time permit the magnet to negotiate turns, mashes, dents and the like. The prior art is replete with attempts to solve these problems and none have been as successful as the instant invention.

Another problem which has plagued industry has been the lack of a testing instrument which would be adequately sensitive to flux leakage and at the same time negotiate turns, mashes, dents and the like in pipe.

It is therefore an object of this invention to provide an inspection device for passing axially through a pipe and establishing a magnetic field therein around substantially the full circumference of the pipe with a minimum of air gap therebetween.

It is another object of this invention to provide an inspection device for inspecting pipe, wherein the search coils are held resiliently in close proximity to the surface of the pipe to thereby increase the degree of accuracy of the results obtained by the testing procedure.

These and other objects of the invention will be evidenced by the description herein.

Briefly stated the apparatus of this invention comprises a housing for passing axially through the pipe. Means are provided for effecting relative movement of the housing through the pipe, as for an example, a cable attached to the housing. A magnet is centrally positioned within the housing and is preferably an electromagnet. This magnet has north and south poles. The central axes of these are generally coincident with the central axis of the pipe.

There are a pair of resilient expandable magnetically permeable annular members, one of which surrounds each of the poles of the magnet and are of a size to resiliently contact the inside of the pipe in the expanded condition. Thus, these annular members are for the purpose of providing a longitudinal magnetic field in a portion of the pipe. Means are also provided for expanding these annular members at a predetermined time. This expansion can be accomplished in a number of ways but is preferably by fluid pressure.

Magnetic responsive means are also mounted adjacent to the magnet and about midpoint between the magnetically permeable members and are for the purpose of detecting flux leakage from the pipe. Thus, not only are the magnetizing members resilient expandable and magnetically permeable, but the magnetic responsive means may also be mounted on a resilient expandable nonmagnetically permeable annular member.

Reference to the drawings will further explain the invention herein where like numerals refer to like parts and in which:

FIG. 1 is a side elevation view showing one embodiment of the tool of this invention as it would appear being suspended in a casing.

FIG. 2 is a side elevation view partly in central vertical section showing certain of the details of the tool shown in FIG. 1.

Referring now to FIG. 1, one embodiment of the present invention is shown as it would appear being suspended in casing 11 on support cable 12 by fishing neck 13. Immediately below fishing neck 13 is an enlarged body portion with a frusto conical portion 14 and body 15 having a plurality of safety catches 16 of standard design.

Immediately therebelow is upper centralizer assembly 17 having a plurality of spring loaded centralizer rollers 18 thereabout for contacting the inside surface of casing 11 and centrally positioning the upper portion of the tool.

Immediately below upper centralizer assembly 17 is a reservoir section 19 having a plurality of fluid openings 20 thereabout. Immediately below the fluid reservoir section 19 is a section of the tool which is designated as upper expandable pole assembly 21 having a plurality of flexible fingers 22 attached thereto and pointing downwardly therefrom at an angle of less than 90° with respect to the central axis of casing 11.

Immediately below upper pole assembly 21 is a section designated as expandable detector assembly 23 having a plurality of staggered slots 24 and magnetic responsive means 25 staggered thereabout.

Just below detector assembly 23, there is attached lower expandable pole assembly 26 which is similar to upper pole assembly 21.

Attached to the lower end of lower expandable assembly 26 is a lower centralizer assembly 27 having a plurality of spring loaded centralizing rollers 28 positioned thereabout for centrally positioning the lower end of the tool in casing 11.

Referring now to FIG. 2, which is a fragmented view of the tool shown in FIG. 1 partially in central vertical section, it will be seen that reservoir section 19 has a plurality of fluid openings 20 thereabout. Section 19 is threaded on to the lower end 31 of centralizer assembly 17 with O-ring seal 32 therebetween.

Inside of reservoir section 19 is a resilient fluid chamber 33 formed by a flexible pouch 34 for containing a fluid such as oil or the like. Pouch 34 is so designed that fluid may be pumped into or out of the pouch, with the pouch collapsing as the fluid is pumped out. Hence, the fluid openings 20 permit the well fluid or air to flow into and out of the area inside of section 19 and surrounding pouch 34.

The bottom portion of section 19 is provided with internal threads which are engaged with threads on annular nonmagnetic connector 35 which has motor 36 and pump 37 mounted therein. Pump 37 is connected with pouch 34 by upper conduit 38 and to lower conduit 39. Connector 35 has a reduced lower portion 40 which is threaded to iron core 41 which extends downwardly therefrom and through lower pole assembly 26 shown in FIG. 1. The upper portion of iron core 41 is surrounded by steel sleeve 46 of a magnetically conductive material and is held in place by snap ring 47 at its upper end and by being abutted against another sleeve designated as intermediate sleeve 48 therebelow.

Formed about the exterior of sleeve 46 is a resilient expandable magnetically permeable annular member of a size to resiliently contact the inside of casing 11 when in the expadned condition. There are a plurality of annular discs 42 having fingers 22 attached thereto, which discs are attached to sleeve 46 and point downwardly at an angle of about 60° with respect to the central axis of the pipe. Discs 42 are joined by a plurality of annular webs 49, hence forming a plurality of annular openings 50 about the tool.

Upper annular opening 50 communicates with conduit 39 via a small fluid passage 51 provided in upper disc 42. It is to be understood that fingers 22 extend from the outside edge of webs 49.

Each of the annular openings 50 are connected by additional fluid passages 51, such that all the annular openings 50 are in communication with fluid chamber 33 via conduit 38, pump 37, and conduit 39.

Immediately below steel sleeve 46 and as explained above is another sleeve 48 made of a non-magnetically conductive material to which is molded a resilient expandable nonmagnetic member which likewise defines a plurality of annular chambers or openings. This is the portion of the tool previously referred to as the detector assembly 23 as shown in FIG. 1 having vertical slots 24 staggered thereabout in annular rolls and interspersed with two rows of magnetic responsive means 25 which are preferably search coils embedded just under the surface, as will now be explained.

Expandable detector assembly 23 is of a nonmagnetically conductive material and has a plurality of plastic housings 52 arranged in two rows around the assembly and have embedded therein the search coils or magnetic responsive means 25 just under the surface thereof.

Detector assembly 23 is formed with two annular openings 53 therebout, which openings are connected to the lower annular opening 50 of upper pole assembly 21 by conduit 54 and fluid passage 55 in upper web 56. Annular openings 53 are connected together by fluid passages 57 in intermediate web 58, which web separates the two annular rows of magnetic responsive means 25.

Immediately under sleeve 48 and surrounding iron core 41 is an annular magnetizing coil 60 which is connected to appropriate power source whereby the coil may be energized and thus establishing a magnetic field in the pipe as will be explained hereinafter.

The lower end of sleeve 48 is secured by snap ring 61. Just below snap ring 61 is electrical plug 62 which screws into iron core 41 and is designed for connection to the plurality of search coils or magnetic responsive means 25. A cable leading from plug 62 leads upward through central aperture 63 of the tool upward through support cable 12 for communication to the surface or to appropriate control panels.

Just below plug 62 is another snap ring 64 which forms a part of lower pole assembly 26 shown in FIG. 1. As explained above, lower pole assembly 26 is similar to upper pole assembly 21 and has a plurality of annular openings 66 therein. These annular openings are connected together by fluid passage 69 therebetween and by conduit 67 to the lower annular opening 53 of detector assembly 23. The lower annular opening 66 is provided with an opening in which plug 68 is fitted and which may be removed for purging air from the tool.

The bottom portion of iron core 41 is threaded to lower centralizer assembly 27, which assembly is of a non-magnetic material so as not to distort the flux pattern established by the electromagnet.

It is to be understood that while the tool may be described as having only one fluid conduit from one annular chamber to another, there may be a plurality of such fluid passages such that the pressure applied by pump 37 will be uniform in all portions of the expandable parts of the tool.

The operation of the tool will now be explained in detail. Initially plug opening 68 will be removed and all air removed from the tool by pumping fluid from fluid chamber 33 into annular openings 50, 53 and 66. These passages are then collapsed by pumping fluid therefrom and back into fluid chamber 33. With these passages or openings thus collapsed, fingers 22 will be withdrawn from their most outwardly expanded position and hence able to clear the inside of casing 11 so that the tool may be lowered into casing 11. Similarly the detector assembly 23 will be collapsed and it too will be free to move in the casing 11. When the tool has been lowered to the desired position, motor 36 can be started by appropriate controls such that pump 37 will operate to pump fluid through conduit 38, inton conduit 39 and into upper annular opening 50, since the various passage ways are connected by fluid passages and/or conduit means. The pumping operation is continued until the desired pressure is reached at which point fingers 66 will be expanded radially outward and in contact with the inside of casing 11. Similarly, magnetic responsive means 25 will be pushed outward in close proximity to the inside surface of casing 11. With the various parts of the tool thus expanded, magnetizing coil 60 is energized by supplying electrical power thereto, thus setting up a magnetic field in casing 11, which is to be inspected.

Upper and lower expandable pole assemblies 21 and 26, and fingers 22 are made of a resilient conductive material such as a mixture of neoprene or other elastomers, such as rubber, mixed with a very high content of iron oxide or iron powder. A good treatise on conductive elastomers which could be utilized for making upper pole assembly 21 and lower pole assembly 26 is taught in the following book: Conductive Rubber, Its Production, Application and Test Methods, by R. H. Norman, McClaren & Sons, Ltd., McClaren House, 131 Great Suffolk Street, London, S.E.I. First Impression 1957, Second Impression 1959.

Since upper pole assembly 21 and lower pole assembly 26 are magnetically conductive, there will be established in casing 11 a longitudinal magnetic field which magnetic field extends from the lower end of core 41 through lower pole assembly 26, through the casing 11, through upper pole assembly 21 to the upper end of core 41.

With the magnetic field thus established and with the expandable members holding fingers 22 and magnetic responsive means 25 in close proximity to the inside surface of casing 11, the air gap is reduced to a very minimum. By having the air gap so reduced, less power is required to operate the electromagnet and inspection is much more definitive. With the tool thus operating, the tool housing may be moved up in the casing by drawing upward on cable 12. By thus moving along, it is possible to inspect the casing for defects wherein the magnetic responsive means detect variation in flux leakage as defects in the casing.

When it becomes desirable to discontinue inspection operations, then electrical motor 36 may be reversed, causing pump 37 to pump in reverse direction thereby withdrawing fluid from the annular chambers, hence collapsing the tool so it may be withdrawn from the casing.

It is to be understood that there are many alternatives for this invention. Detector assembly 23 is preferably made of a nonconductive material so as not to distort the magnetic field established by the electromagnet. The fingers 22 of upper pole assembly 21 and lower pole assembly 22 are so arranged that well fluid will bypass the fingers, hence permitting the tool to be drawn upward in the casing. Since the magnetic flux spreads out from each of the fingers 22, a magnetic field is established in substantially the full circumference of the casing. The rows of fingers 22 could, of course, be staggered to insure that the magnetic field is uniform if this were a problem. While discs 42 have been described as being at an angle with respect to the central axis of casing 11, it is to be understood that in some instances this might not be necessary. However, by having them at an angle of less than 90° and preferably of about 60°, they may be more readily moved outwardly when fluid is pumped into annular openings 50.

It is to be further understood that while rubber discs 42 and fingers 22 are the preferred embodiment of the resilient, expandable, magnetically permeable members, and that they are expandable by means of a pressurized fluid, other means may be used to accomplish this expansion. For example, they could be expanded by mechanical means actuated by solenoids or the like. Alternatively, and since the establishment of a strong magnetic current will cause the pole assemblies 21 and 26 to be attracted to casing 11, a very strong electromagnet could be used to establish a very strong magnetic field, causing fingers 22 to expand into contact with casing 11.

While an electromagnet has been described, a permanent magnet may be used under some circumstances.

Since expandable detector assembly 23 is of a nonconductive material such as rubber, it can be more readily expanded outwardly than pole assemblies 21 and 26, because those assemblies are made of a material that is magnetically conductive and hence less elastic.

Thus, it will be observed that the industry has been provided with a convenient tool for use in inspecting casing wherein the air gap is reduced to a minimum which permits much more definitive inspection with much less power. The tool has been described as being one for use in a downhole operation, but it is likewise adaptable for use in above ground inspection. Since the expandable nature of the tool is controllable by operation of pump 37, there is little danger of the tool becoming lodged in the casing. If such would occur, then fishing means can be used to retrieve the tool.

Further modifications may be made in the invention as particularly described without departing from the scope of the invention. Accordingly, the foregoing description is to be construed illustratively only and is not to be construed as a limitation upon the invention as defined in the following claims.

What is claimed is:

1. In an apparatus for inspecting pipe for defects comprising:
    a housing for passing axially through said pipe,
    means for effecting relative movement of said housing through said pipe,
    a magnet centrally positioned in said housing and having north and south poles,
    a pair of resilient, expandable, magnetically permeable annular members, one of which surrounds each of the poles of said magnet and which are of a size to resiliently contact the inside of said pipe when in the expanded condition, whereby a longitudinal magnetic field is established in said pipe by said magnet,
    means for expanding said magnetically permeable annular members at a predetermined time, and
    magnetic responsive means mounted adjacent said magnet at about midpoint between said magnetically permeable annular members for detecting flux leakage from said pipe.

2. The apparatus as claimed in claim 1 wherein:
    said magnetic responsive means are mounted in a resilient expandable, nonmagnetic member, whereby said magnetic responsive means are placed in close proximity to the inside surface of said pipe when said non-magnetic member is expanded, and including means for expanding said nonmagnetic member at a predetermined time.

3. The apparatus as claimed in claim 1 wherein:
    said expandable, magnetically permeable annular members are formed with closed annular chambers therein, and including
    a reservoir mounted in said housing for containing a fluid,
    conduit means leading from said reservoir to said annular chambers, and
    a pump connected to said conduit means for pumping said fluid between said reservoir and said annular chambers.

4. The apparatus as claimed in claim 2 wherein:
    said resilient, expandable, nonmagnetic member is annular in shape and defines another closed annular chamber, and
    said magnetic responsive means includes a plurality of search coils spaced about the periphery of said annular nonmagnetic member, and having
    conduit means connecting said closed annular chamber with the chambers of said magnetically permeable members.

5. In an apparatus for inspecting pipe for defects comprising:
    a housing for passing axially through said pipe,
    means for effecting relative movement of said housing through said pipe,
    a magnet centrally positioned in said housing and having the north and south poles, the central axes of which are generally coincident with the central axis of said pipe,
    a pair of resilient, expandable, magnetically permeable annular members, one of which surrounds each of said poles and which are of a size to resiliently contact the inside of said pipe when in the expanded condition, whereby a longitudinal magnetic field is established in said pipe by said magnet and said magnetically permeable annular members,
    pump means for expanding said expandable magnetically permeable annular members at a predetermined time,
    an expandable nonmagnetic annular member surrounding said magnet at about midpoint between the ends thereof,
    means for expanding said nonmagnetic annular member at a predetermined time, and
    magnetic responsive means mounted about the periphery of said nonmagnetic annular member which means are responsive to flux leakage from said pipe, for detecting defects in said pipe.

6. The apparatus as claimed in claim 5 wherein:
    each member of said pair of resilient, expandable, magnetically permeable annular members has a plurality of fingers connected thereto about the periphery thereof, which are adapted to contact the inside surface of said pipe and to form the magnetic flux path.

7. The apparatus as claimed in claim 6 wherein:
    said fingers are arranged in annular rows and project downwardly at an angle of less than 90° with respect to the central axis of the pipe.

No references cited.

RICHARD B. WILKINSON, *Primary Examiner.*